Aug. 12, 1969  R. C. POSH  3,460,793
ADJUSTABLE SEAT ASSEMBLY
Filed March 15, 1967  3 Sheets-Sheet 1

INVENTOR.
Raymond C. Posh
BY
Barnard, McEllyne & Reising
ATTORNEYS

Aug. 12, 1969  R. C. POSH  3,460,793
ADJUSTABLE SEAT ASSEMBLY
Filed March 15, 1967  3 Sheets-Sheet 2

INVENTOR.
Raymond C. Posh
BY
Barnard, McGlynn & Reising
ATTORNEYS

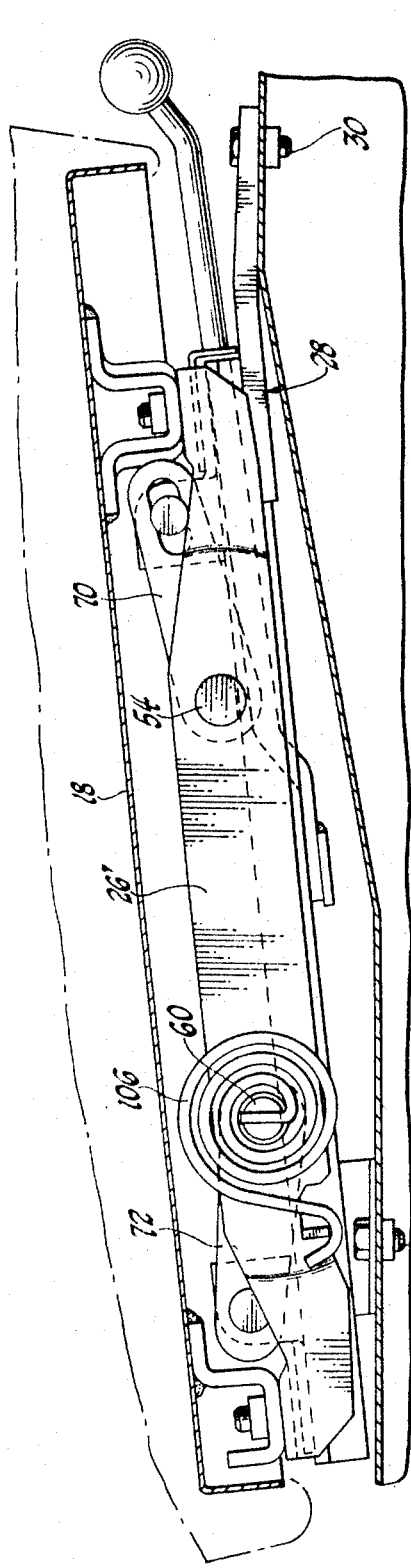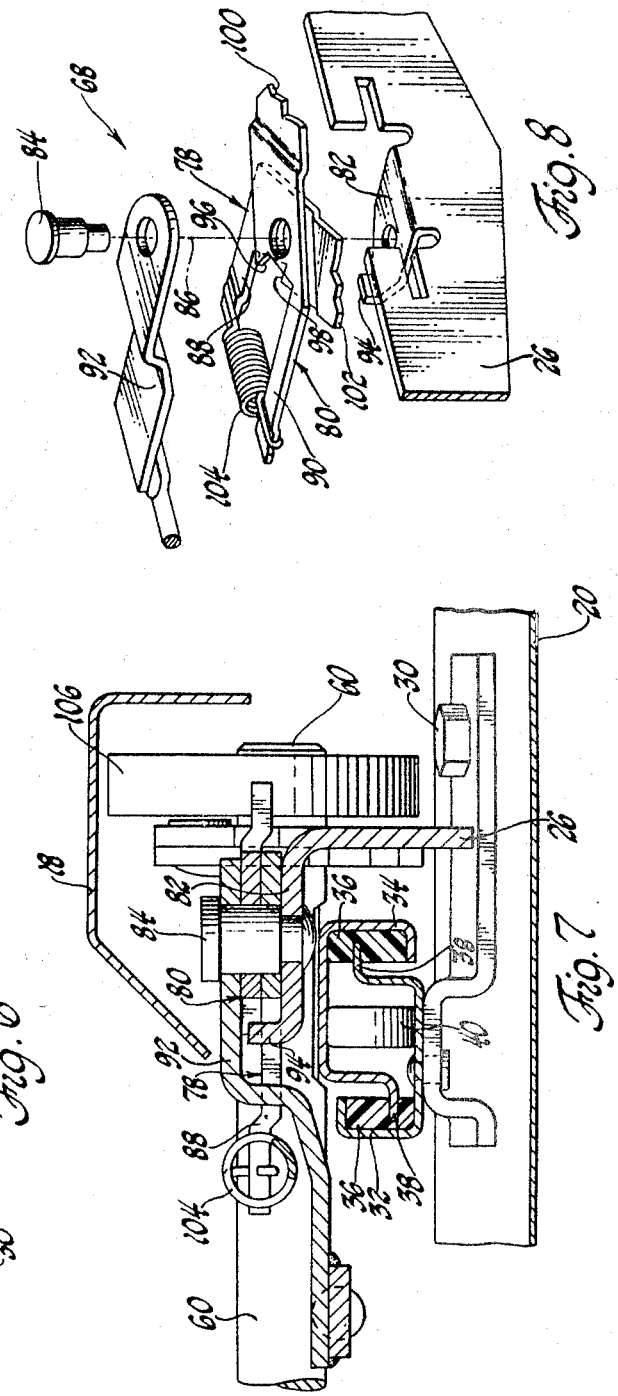

United States Patent Office 3,460,793
Patented Aug. 12, 1969

3,460,793
ADJUSTABLE SEAT ASSEMBLY
Raymond C. Posh, Livonia, Mich., assignor to Lear Siegler Inc., Santa Monica, Calif., a corporation of Delaware
Filed Mar. 15, 1967, Ser. No. 623,261
Int. Cl. F16m 11/24, 13/00; B60n 1/02
U.S. Cl. 248—394                     13 Claims

ABSTRACT OF THE DISCLOSURE

An adjustable seat supporting assembly including a pair of spaced seat support members and base means including tracks for adjusting the horizontal position of the seat. The seat support members and the base means are interconnected by elongated levers, each of which is pivotally connected to the base means and independently pivotally connected to the seat support members. There are two such levers on each side of the seat assembly. The pivotal connection of each of the levers to the seat support member on one side of the seat assembly is disposed inwardly and between the pivotal connection of the respective levers to the base means. The inward ends of the levers on each side of the assembly include a plurality of notches therein and are spaced apart. A latching means is operatively attached to one of the support members and engages the notches in the respective levers for selectively controlling the pivotal movement of the levers to selectively change the vertical position of either or both the front and rear portions of the seat support members.

---

This invention is directed to a seat assembly for use in vehicles such as automobiles and trucks. There are various prior art seat supporting assemblies which are adjustable so that the vertical position of both the front and rear portions of the seat may be individually adjusted. Many such prior art seat assemblies utilize power actuated devices for independently raising or lowering the front and rear portions of the seat. Such power actuated mechanisms are, however, complex and therefore susceptible to malfunction, difficult to manufacture, and expensive. In some environments, therefore, it is desirable to utilize an adjustable seat supporting assembly which is manually actuated.

One of the problems associated with the prior art seat positioning assemblies, whether they are power actuated or mechanically actuated, is that such assemblies use an undesirable amount of vertical space below the seat assembly. There are assemblies wherein a small amount of vertical space is occupied by the assembly; however, such assemblies do not provide the degree of vertical adjustment that is desired. On the other hand, those prior art assemblies which provide the degree of vertical adjustment that is desired utilize an undesirable amount of vertical space below the seat.

U.S. Patent 2,609,029 disclosures a prior art seat assembly for independently adjusting the vertical position of both the front and rear portions of the seat. Such an assembly works very satisfactorily in most environments but is not suited for particular environments where the vertical space utilized by the seat supporting assembly must be a minimum. For example, the bucket seat assemblies utilized in sports cars must employ a positioning or adjustment mechanism which utilizes a minimum amount of space due to the limited space available in such sports cars. The assembly disclosed in the abovementioned patent utilizes a seat support member which is operatively connected to a base member by a pair of substantially pie-shaped links which are respectively connected to the support member and the base member. A latching mechanism is utilized to engage notches in the pie-shaped members for controlling their respective pivotal movement, thus adjusting the vertical position of either or both the front and rear portions of the seat. The manner in which the pie-shaped members are pivotally connected to the support member and the base member as well as the configuration of the latching means requires a substantial and frequently a prohibitive amount of vertical space.

Accordingly, it is an object and feature of this invention to provide an improved mechanically adjustable seat supporting assembly which may be utilized to independently adjust the vertical position of either or both the front and rear portions of the seat which occupying a minimum of vertical space.

Another object and feature of this invention is to provide an improved adjustable seat supporting assembly which has at least one seat support member operatively connected to a base through first and second levers, each of which are pivotally connected to the seat support member and the base so that the pivotal connections of the levers to the seat support member are disposed inwardly of and between the pivotal connections of the levers to the base thereby occupying a minimum of vertical space yet providing the desired amount of vertical adjustment.

In correlation with the foregoing object, a further object and feature of this invention is to provide a novel latching means disposed between and engaging the opposing ends of the levers for independently controlling pivotal movement of the levers.

In general, these and other objects and features of this invention may be attained in a preferred embodiment including a seat support member and a base means adapted for attachment to a support structure. The seat support member is operatively connected to the base means by first and second elongated levers. Each lever is pivotally connected to the base means and is independenly pivotally connected to the seat support member. The pivotal connections of the levers to the seat support members are disposed inwardly of and between the pivotal connections of the levers to the base means thereby consuming a minimum of vertical space. The levers have ends which extend inwardly toward one another from the respective pivotal connections thereof to the seat support members. These ends of the levers are spaced apart and have notches therein. A pair of latch plates are rotatably attached to the seat support member and selectively engage the notches in the respective levers for controlling pivotal movement of the levers. The latch plates are biased into the notches of the respective levers and a link is mounted for rotation on the support member so that upon rotation of the link in one direction, one of the latch plates is moved out of engagement with the notches in one of the levers and upon rotation of the link in the oppposite direction, the other latch plate is moved out of engagement with the notches of the other lever. The instant invention thereby provides an assembly employing a novel relationship between the components so as to occupy a minimum of vertical space but yet provide the desired amount of vertical adjustment.

Other objects and attendant advantages of the present invention will be readily appreciated as the same becomes better understood by reference to the following detailed description when considered in connection with the accompanying drawings wherein:

FIGURE 6 is an enlarged cross-sectional view taken substantially along line 6—6 of FIGURE 4;

FIGURE 7 is an enlarged fragmentary cross-sectional view taken substantially along line 7—7 of FIGURE 4; and FIGURE 8 is an exploded view of the novel latching mechanism of the instant invention.

Figure 1:
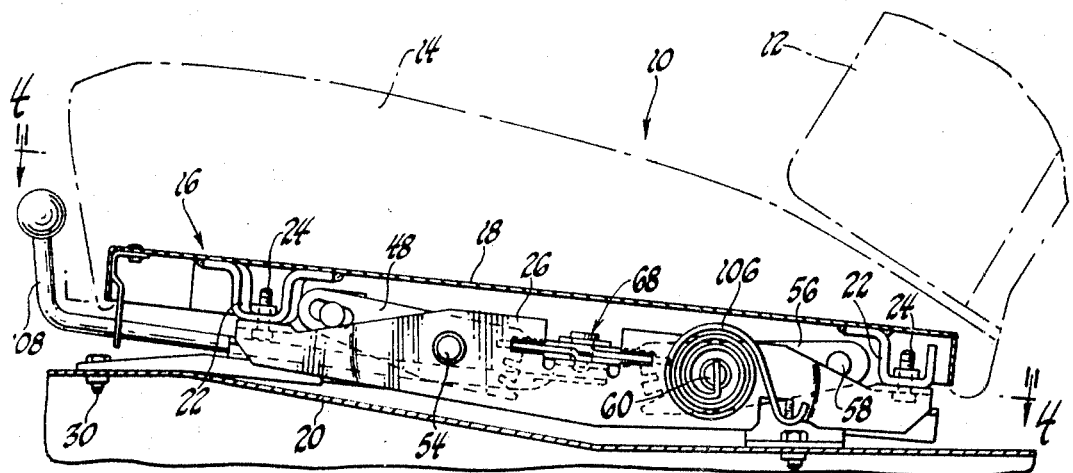
FIGURE 1 is an elevational view partially in cross section of a preferred embodiment of the instant invention and showing the seat in the lowermost vertical position.
Figure 2:
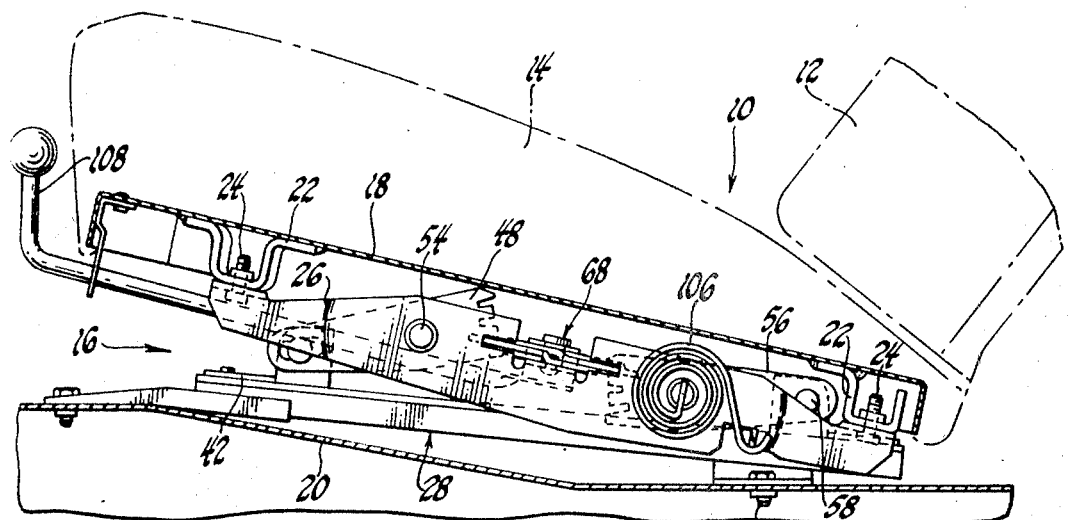
FIGURE 2 is an elevational view partially in cross section of the preferred embodiment of the invention with the front portion of the seat raised vertically to the maximum extent.
Figure 3:
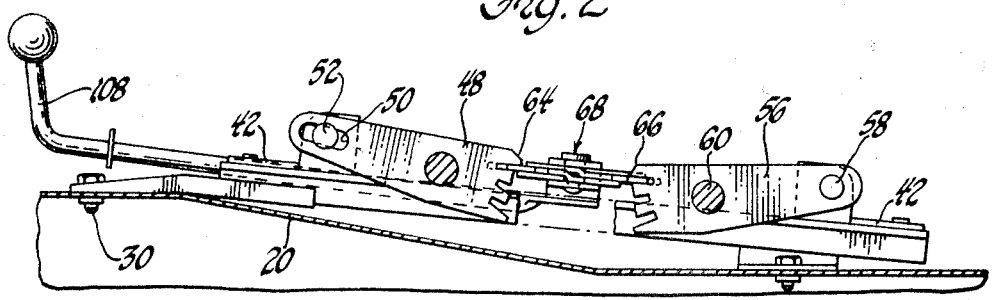
FIGURE 3 is a cross-sectional view similar to FIGURE 1 but taken along a different vertical plane to more clearly show some of the components.

Referring now to the drawings, wherein like numerals indicate like or corresponding parts throughout the several views, a seat assembly is generally indicated at 10 in FIGURES 1 and 2. The seat assembly includes a back cushion 12 and a seat cushion 14. The adjustable seat supporting assembly of the instant invention is generally shown at 16. A frame member 18 forms parts of the seat frame and a support structure is shown at 20. The support structure 20 is normally a portion of the vehicle body. The frame member 18 has a pair of attachment members 22 welded thereto on each side of the assembly. The members 22 are attached by the bolts 24 to a pair of seat support members 26 and 26'.

Figure 4:
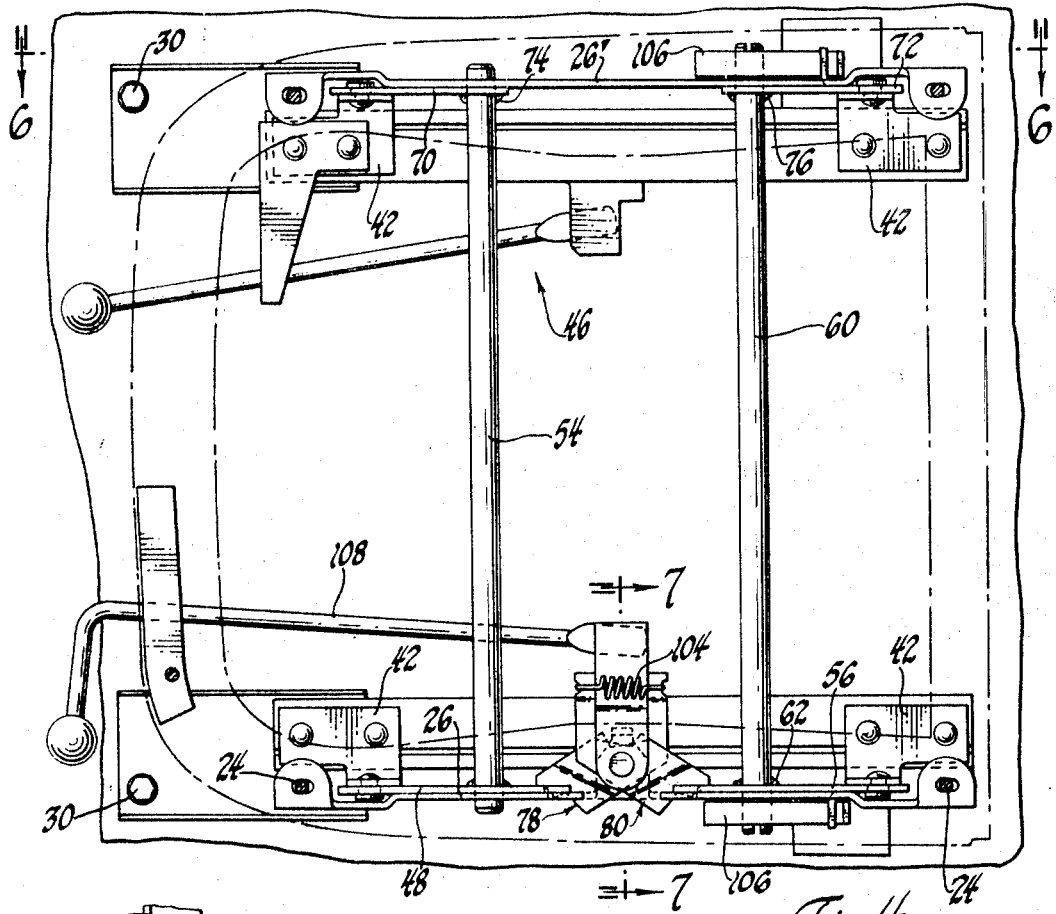
FIGURE 4 is a cross-sectional view taken substantially along line 4—4 in FIGURE 1.

There is also included base means, generally indicated at 28 in FIGURE 2. The base means 28 is attached to the support structure 20 by the bolts 30. As best illustrated in FIGURE 7, the base means 28 includes track means for adjusting the horizontal position of the assembly. There is included a lower track member 32 and an upper track member 34. The track members 32 and 34 retain plastic inserts 36 which in turn slidably support flanges 38. Also, rollers 40 are disposed between the track members 32 and 34. Two brackets 42 are secured by rivets 44, or the like, to each upper track member 34. As best illustrated in FIGURE 4, the base means 28 includes two such track assemblies and each is secured to a support member 26 or 26'. Thus, the track member 34 may move longitudinally relative to the track member 32 for adjusting the horizonatl position of the seat. A mechanism for latching the track means in the desired horizontal position is generally shown at 46 and is of the type well known in the art and including a member attached to one of the track members and normally disposed in slots in the other track member to prevent relative longitudinal movement therebetween.

A first lever 48 is pivotally connected to support bracket 42 of the base means and is independently pivotally connected to the seat support member 26. More specifically, the first lever 48 includes a slot 50 which is disposed on the pin or rivet 52 so as to pivotally connect the lever 48 through a lost motion connection to a support bracket 42. A first torque bar 54 is rotatably supported by and extends between the seat support members 26 and 26'. As best illustrated at 56 in FIGURE 5, the torque bar 54 is non-rotatably secure to the first lever 48 by welding or the like. Thus, the torque bar 54 provides the pivotal connection between the first lever 48 and the seat support member 26.

There is also included a second lever 56 which is pivotally connected by the pin or rivet 58 to a rear support bracket 42 of the base means. The second lever 56 is independently pivotally connected to the seat support member 26 through a second torque bar 60. The second torque bar 60 is rotatably supported by and extends between the seat support members 26 and 26'. The second lever 56 is non-rotatably secured to the second torque bar 60 as by welding indicated at 62 in FIGURE 4. Thus, there is provided a pivotal connection between the second lever 56 and the support member 26.

An important feature of the instant invention is the feature wherein the respective pivotal connections of the levers 48 and 56 to the seat support member 26 through the torque bars 54 and 60 are disposed inwardly of and between the pivotal connections of the levers 48 and 56 to the forward and rearward support brackets 42. It will be noted that this general relationship of the pivotal connections exists during all pivotal positions of the levers 48 and 56. The first and second levers 48 and 56 have first ends 64 and 66 which extend inwardly toward one another from the respective pivotal connections of the levers to the support member 26. The respective ends 64 and 66 are spaced apart and have notches therein. A latching means, generally indicated at 68, is operatively connected to the seat support support member 26 for selectively engaging the notches to independently control pivotal movement of the levers 48 and 56.

As alluded to above and as best illustrated in FIGURES 4 and 6, the opposite ends of the torque bars 54 and 60 are rotatably supported in the second seat support member 26'. There is also included third and fourth levers 70 and 72 which pivotally interconnect the second seat support member 26' to support brackets 42. The third lever 70 is parallel to the first lever 48 and the fourth lever 72 is parallel to the second lever 56. The third lever 70 is non-rotatably secured to the torque bar 54, as by welding indicated at 74, and the fourth lever 72 is secured, as by welding indicated at 76, to the torque bar 60. It will be noted that the levers 70 and 72 are disposed in the same relative disposition as are the levers 48 and 56 but differ from the levers 48 and 56 by not having notches on the inward ends thereof.

Figure 5:
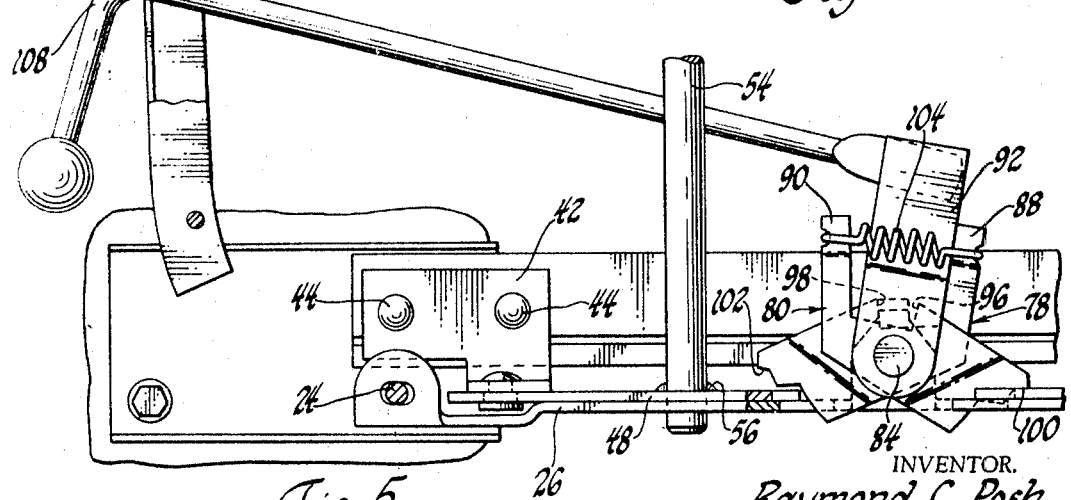
FIGURE 5 is an enlarged fragmentary cross-sectional view of the latching mechanism of the instant invention.

The latching means 68 includes a first latch plate, generally indicated at 78, and a second latch plate, generally indicated at 80. The seat support member 26 has a bent over flange 82. The first latch plate 78 is rotatably connected to the flange 82 by the rivet 84 for movement into and out of engagement with the notches in the first lever 48. In a like manner, the second latch plate 80 is rotatably connected to the flange 82 by the rivet 84 for movement into and out of engagement with the notches in the second lever 56. It will be noted that the first and second latch plates 78 and 80 are rotatably connected to the flange 82 of the seat support member 26 for rotation about a common axis 86 as indicated in FIGURE 8. Latch plate 78 includes the arm 88 and latch plate 80 includes the arm 90. The arms 88 and 90 are spaced apart and a control link 92 is rotatably connected to the seat support member 26 by the rivet 84 for rotation about the common axis 86. The link 92 has an offset portion and thereby extends over the latch plates and then downwardly between the arms 88 and 90 of the respective latch plates so that upon rotation of the link 92 in one direction, as illustrated in FIGURE 5, the link 92 engages the arm 88 of the first latch plate 78 to rotate the first latch plate 78 out of engagement with the notches in the first lever 48 to allow the first lever 48 to pivot and, upon rotation of the link 92 in the opposite direction, the link 92 engages the arm 90 of the second latch plate 80 to rotate the second latch plate 80 out of engagement with the notches in the second lever 56 to allow the second lever 56 to pivot. Since the first lever 48 is non-rotatably secured to the torque bar 54 and the third lever 70 is non-rotatably secured to the torque bar 54, the latch plate 78 controls pivotal movement of both of the first and third levers 48 and 70 and the latch plate 80 controls the pivotal movement of both of the second and fourth levers 56 and 72.

The flange 82 of the seat support member 26 includes an upwardly extending tab 94. The tab 94 extends substantially parallel to the common axis 86 and is disposed between spaced stop portions 96 and 98 on the respective latch plates. Hence, when each latch plate is rotated out of engagement with the associated lever, the appropriate stop portion 96 or 98 engages the tab 94 to prevent further rotation of the latch plate. The latch plates also include second stop portions 100 and 102 for limiting rotation of the respective latch plates in the opposite direction. The stop portions 100 and 102 engage the associated lever when the latch plates are disposed in notches thereof. There is also included a spring 104 which interconnects the arms 88 and 90 of the respective latch plates 78 and 80 for urging the latch plates into the notches of the first and second levers 48 and 56 while urging the stop portions 100 and 102 into engagement with the first and second levers 48 and 56.

There is also included biasing means comprising the band-type springs 106 which are disposed about each end of the second torque bar 60 and interconnect the torque bar 60 and the seat supporting members 26 and 26' for urging the torque bar 60 to rotate. It is not as easy for an operator to raise the rear portion of the seat as it is the front portion; therefore, the springs 106 urge the rear of the seat upwardly.

To explain the operation, assume the seat is in the position illustrated in FIGURE 1 and it is desired to raise the front portion of the seat. To do this, the handle 108 which is rigidly secured by welding, brazing, or the like, to the link 92 is moved to the position illustrated in FIGURE 5 to move the latch plate 78 out of the notches of the lever 48. The individual in the seat leans backwardly so that the levers 48 and 70 rotate to move the seat support members 26 and 26' upwardly to the position illustrated in FIGURE 2. When the desired vertical height is reached, the link 92 moves back to the neutral position under the action of the spring 104 to allow the latch plate 78 to engage a notch in the end of the lever 48 to maintain the seat in position.

If it is desired to raise the rear portion of the seat, the manual control lever 108 is moved in the opposite direction to move the latch plate 80 out of engagement with the notches in the end of the lever 56. Since it is difficult for the operator to lift the rear portion of the seat, the springs 106 rotate the torque bar 60, which in turn causes the levers 56 and 72 to pivot and raise the rear portion of the seat. When the rear portion of the seat has reached the desired vertical position, the control lever 108 is released and the latch plate 80 engages a notch in the end of the lever 56 to maintain the rear portion of the seat in the desired position.

The seat is lowered in the same manner.

It is important to note that the pivotal connection of the levers to the seat support member are inwardly of the pivotal connections of the levers to the base member and remain in substantially the same relative disposition in all positions of the seat. The latching mechanism 68 is disposed between the two levers to provide a novel combination and disposition of elements in an adjusting assembly for a seat which occupies a minimum of vertical space yet provides the desired degree of vertical adjustment. Thus, the instant invention provides an adjustable seat supporting assembly having a unique geometrical disposition of components and includes an improved latching mechanism, both of which contribute to a unique and novel combination able to vertically adjust the front and rear portions of the seat while occupying a minimum of vertical space.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An adjustable seat supporting assembly comprising: at least one seat support member, base means adapted for attachment to a support structure, a first lever pivotally connected to said base means and independently pivotally connected to said seat support member, a second lever pivotally connected to said base means and independently pivotally connected to said seat support member, the pivotal connections of said levers to said seat support member being disposed inwardly of and between the pivotal connections thereof to said base means, said levers having first ends thereof which extend inwardly toward one another from the pivotal connections of said levers to said seat support member, said first ends of said levers being spaced apart, and latching means operatively connected to said seat support member for selectively engaging said first ends of said levers to independently control pivotal movement of said levers.

2. An assembly as set forth in claim 1 including biasing means operatively connected to at least one of said levers for urging said lever to pivot.

3. An assembly as set forth in claim 1 wherein said levers have notches in said first ends thereof and said latching means selectively engages said notches to control pivotal movement of said levers.

4. An assembly as set forth in claim 3 wherein said latching means includes a first latch plate rotatably connected to said seat support member for movement into and out of engagement with said notches in said first lever, and a second latch plate rotatably connected to said seat support member for movement into and out of engagement with said notches in said second lever, said first and second latch plates being rotatably connected to said seat support member for rotation about a common axis.

5. Assembly as set forth in claim 4 wherein each of said latch plates includes an arm extending therefrom, said arms being spaced apart, and a control link rotatably connected to said seat support member for rotation about said common axis, said link extending between said arms so that, upon rotation of said link in one direction, said ling engages said arm of said first latch plate to rotate said first latch plate out of engagement with said notches in said first lever to allow said first lever to pivot and, upon rotation of said link in the opposite direction, said link engages said arm of said second latch plate to rotate said second latch plate out of engagement with said notches in said second lever to allow said second lever to pivot.

6. An assembly as set forth in claim 5 including a second seat support member disposed in spaced relationship to the first-mentioned seat support member, third and fourth levers pivotally interconnecting said second seat support member and said base means, said third lever being parallel to said first lever and said fourth lever being parallel to said second lever, said first and third levers having a lost motion pivotal connection to said base means, a first torque bar rotatably supported by and extending between said seat support members, said first and third levers being non-rotatably secured to said first torque bar thereby providing the pivotal connection between said first and third levers and said seat support members, and a second torque bar rotatably supported by and extending between said seat suport members, said second and fourth levers being non-rotatably secured to said second torque bar thereby providing the pivotal connection between said second and fourth levers and said seat support members.

7. An assembly as set forth in claim 6 including biasing means operatively connected to said second torque bar for urging said second torque bar to rotate.

8. An assembly as set forth in claim 7 wherein said first-mentioned seat support member includes a tab extending substantially parallel to said common axis and between spaced stop portions on said latch plates so that, when each latch plate is rotated out of engagement with said notches, said stop portion thereof engages said tab to prevent further rotation thereof in one direction.

9. An assembly as set forth in claim 8 wherein each latch plate includes a second stop portion to engage the associated lever when the latch plate is disposed in a notch thereof for limiting further rotational movement of said latch plate in the opposite direction.

10. An assembly as set forth in claim 9 including a spring interconnecting said arm of said latch plates for urging said latch plates into said notches of said first and second levers and said second stop portions thereof into engagement with said first and second levers.

11. An assembly as set forth in claim 10 wherein said biasing means includes a band-type spring disposed about each end of said second torque bar, each spring operatively interconnects said second torque bar and one of said seat supporting members.

12. An assembly as set forth in claim 11 wherein said base means includes track means for adjusting the horizontal position of said support members.

13. An assembly as set forth in claim 1 wherein said latching means includes a first latch plate rotatably connected to said seat support member for movement into and out of engagement with notches in said first end of said first lever, a second latch plate rotatably connected to said seat support member for movement into and out of engagement with notches in said first end of said second lever, and a single handle means movably supported by said seat support member for rotating said latch plates, said handle means being supported to rotate said first latch plate when moved in one direction and to rotate said second latch plate when moved in the opposite direction.

References Cited

UNITED STATES PATENTS

| | | | |
|---|---|---|---|
| 2,609,029 | 9/1952 | Haberstump | 248—394 |
| 2,795,267 | 6/1957 | Williams | 248—394 |
| 3,335,995 | 8/1967 | Pickles | 248—394 |

FOREIGN PATENTS 117,292   9/1946   Sweden.

FRANCIS K. ZUGEL, Primary Examiner

U.S. Cl. X.R.

248—396, 421, 423